United States Patent [19]
Hollingsworth

[11] Patent Number: 5,266,137
[45] Date of Patent: Nov. 30, 1993

[54] RIGID SEGMENTED MANDREL WITH INFLATABLE SUPPORT

[76] Inventor: Ritch D. Hollingsworth, 8579 Mortenson Dr., Fair Oaks, Calif. 95628

[21] Appl. No.: 974,201

[22] Filed: Nov. 10, 1992

[51] Int. Cl.⁵ .......................... B28B 7/30; B28B 7/28; B28B 7/32; B65H 81/00
[52] U.S. Cl. ..................... 156/156; 156/173; 156/175; 156/425; 425/403; 249/65; 249/178; 249/184
[58] Field of Search ............... 156/156, 173, 175, 425; 249/65, 184, 185, 186, 178, 179, 180; 425/403

[56] References Cited

U.S. PATENT DOCUMENTS

| | | |
|---|---|---|
| 2,614,056 | 10/1952 | Francis . |
| 3,220,910 | 11/1965 | Walkey . |
| 3,339,242 | 9/1967 | Lamb . |
| 3,366,522 | 1/1968 | Underwood . |
| 3,376,180 | 4/1968 | Larson et al. . |
| 3,700,519 | 10/1972 | Carter . |
| 3,754,717 | 8/1973 | Saidla . |
| 4,233,020 | 11/1980 | Oswald . |
| 4,238,180 | 12/1980 | Gordon et al. . |
| 4,239,473 | 12/1980 | Fulhaber . |
| 4,389,180 | 6/1983 | Gordon . |
| 4,448,628 | 5/1984 | Stott . |
| 4,450,970 | 5/1984 | Shepherd . |
| 4,581,086 | 8/1986 | Gill et al. ............... 156/425 X |
| 4,597,728 | 7/1986 | McGlashen . |
| 4,822,272 | 4/1989 | Yanase et al. . |

FOREIGN PATENT DOCUMENTS

| | | | |
|---|---|---|---|
| 560759 | 8/1977 | U.S.S.R. ............... | 425/403 |
| 630086 | 10/1978 | U.S.S.R. ............... | 249/65 |
| 1004134 | 3/1983 | U.S.S.R. ............... | 425/403 |
| 1100112 | 6/1984 | U.S.S.R. ............... | 425/403 |

Primary Examiner—Jeff H. Aftergut
Attorney, Agent, or Firm—Pollock, Vande Sande & Priddy

[57] ABSTRACT

A rigid mandrel has a plurality of elongated sector pieces arranged in an edge-to-edge relationship to provide a peripheral wall for forming a hollow shell. One or more bladders are inflated within the peripheral wall by a pressurized fluid and edge portions of the sector pieces are configured to interlockingly engage corresponding edge portions of adjacent sector pieces when the bladder is in its fully inflated condition to form connecting joints which retain the sector pieces in a substantially rigid predetermined configuration corresponding to the peripheral wall. The connecting joints permit the sector pieces to be separated when the bladder is in a deflated condition, and a mandrel member provides an opening for removing the separated sector pieces from an interior chamber of the shell after the forming thereof.

26 Claims, 10 Drawing Sheets

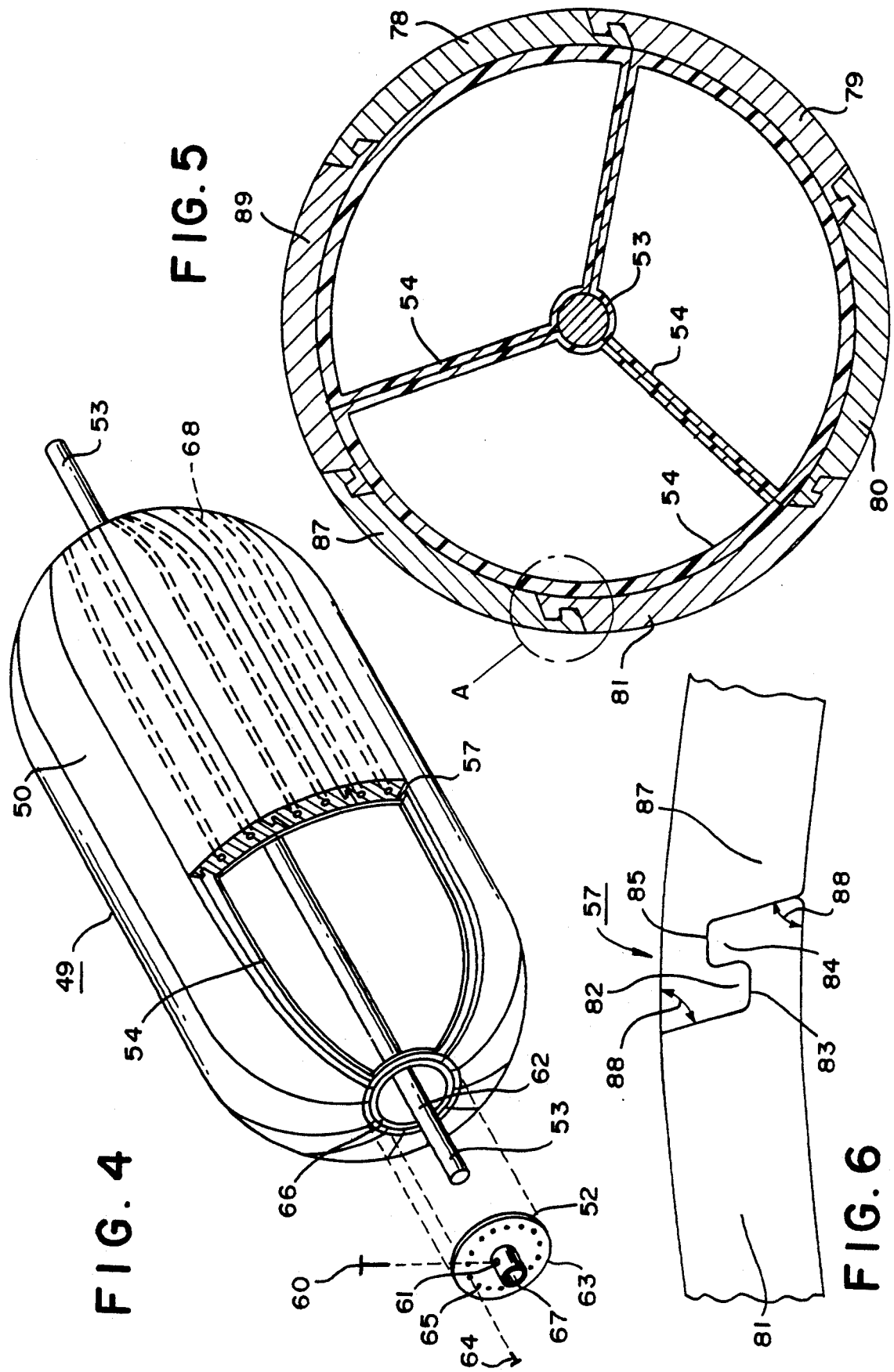

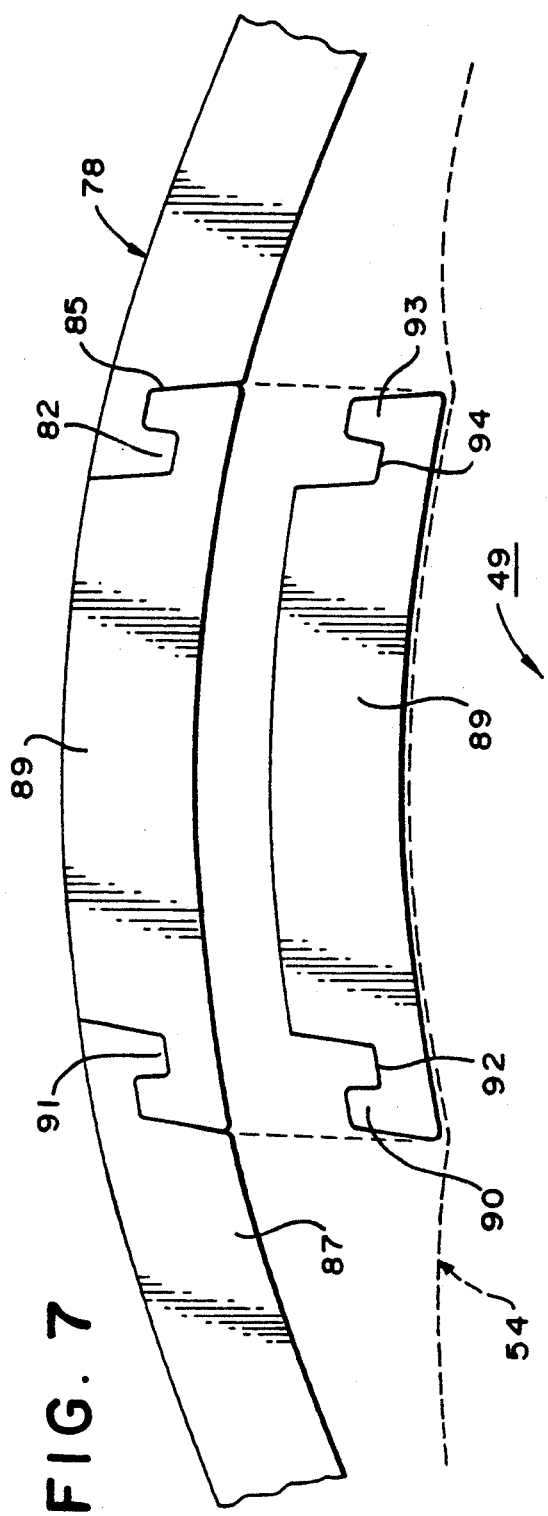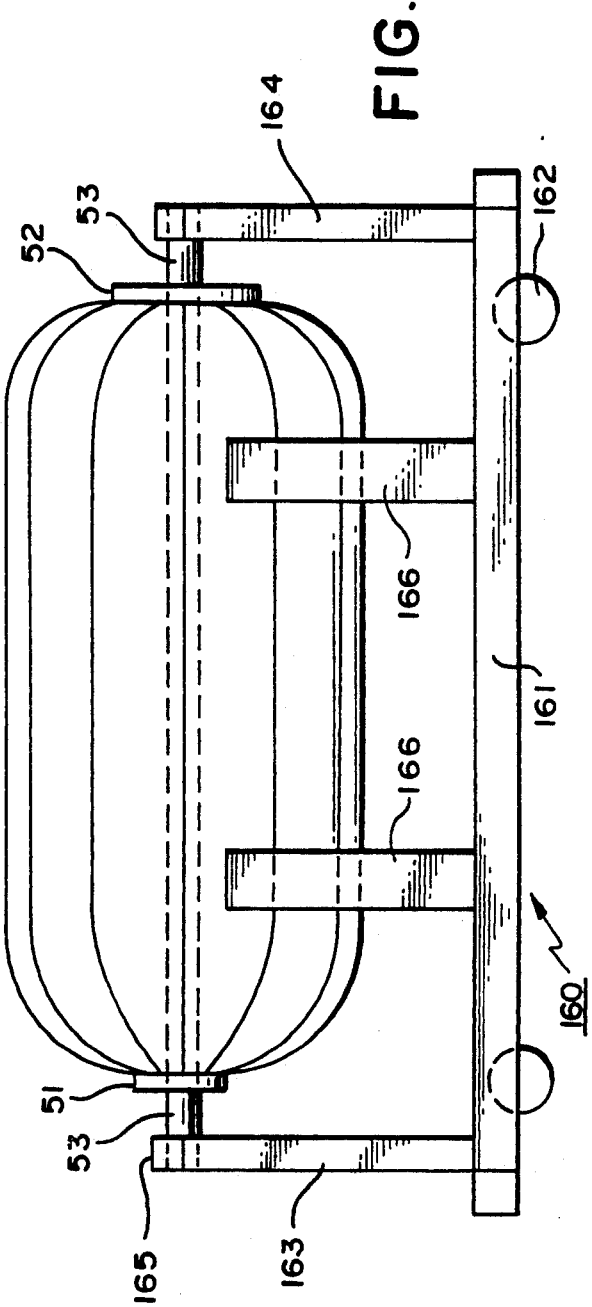

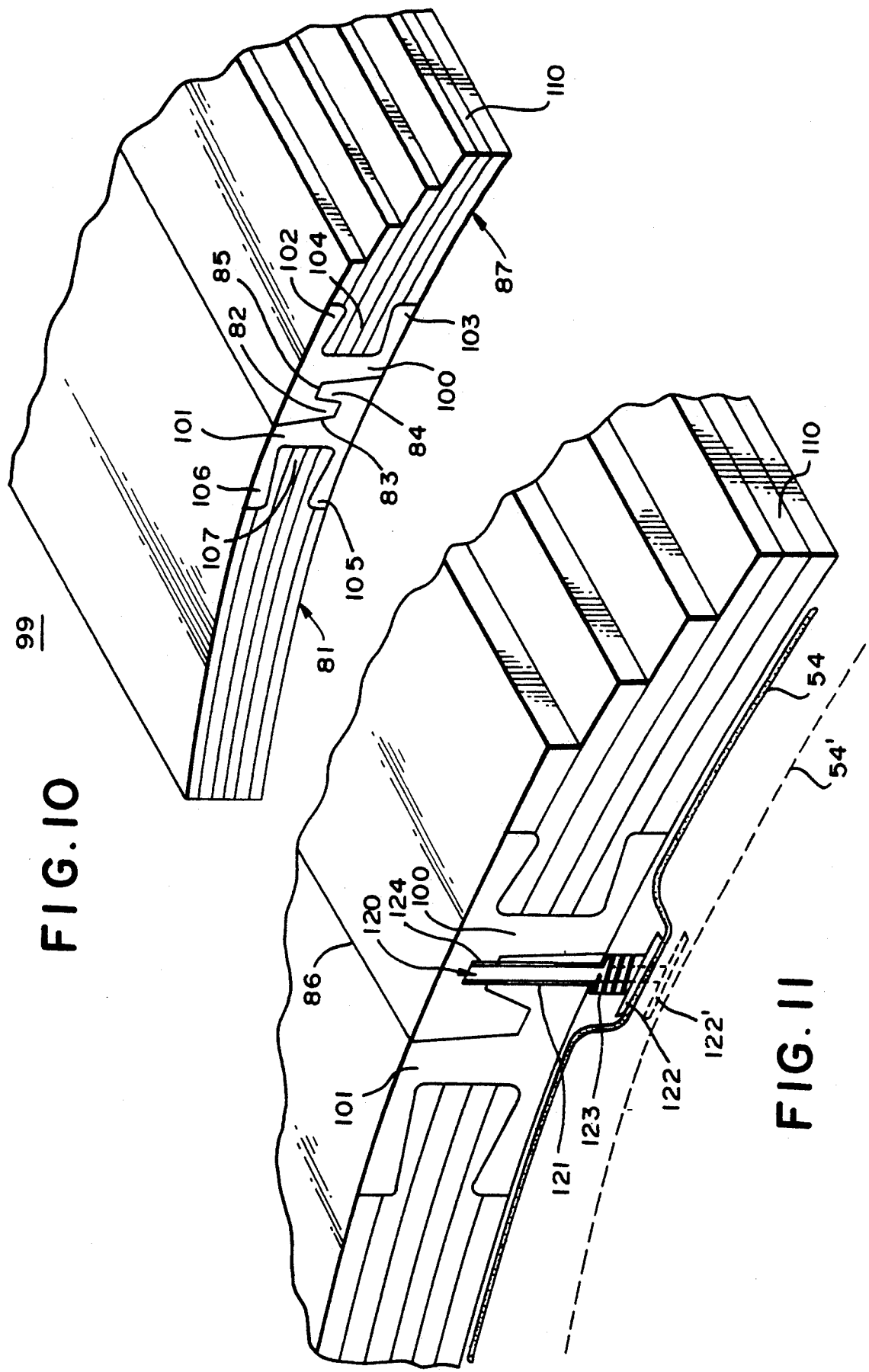

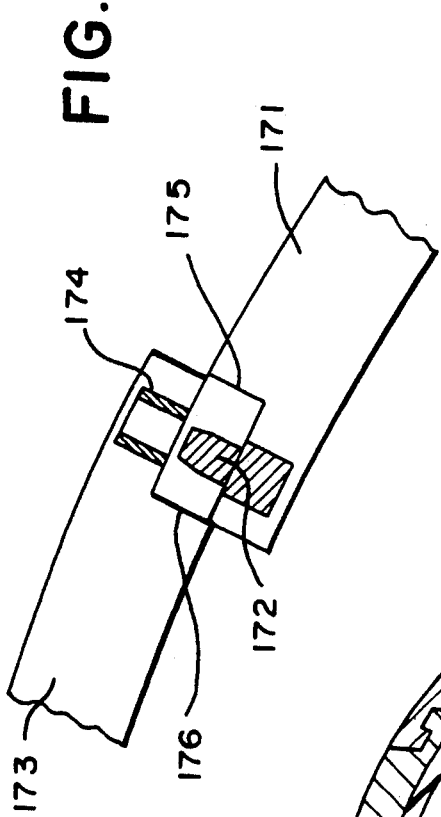
FIG. 13
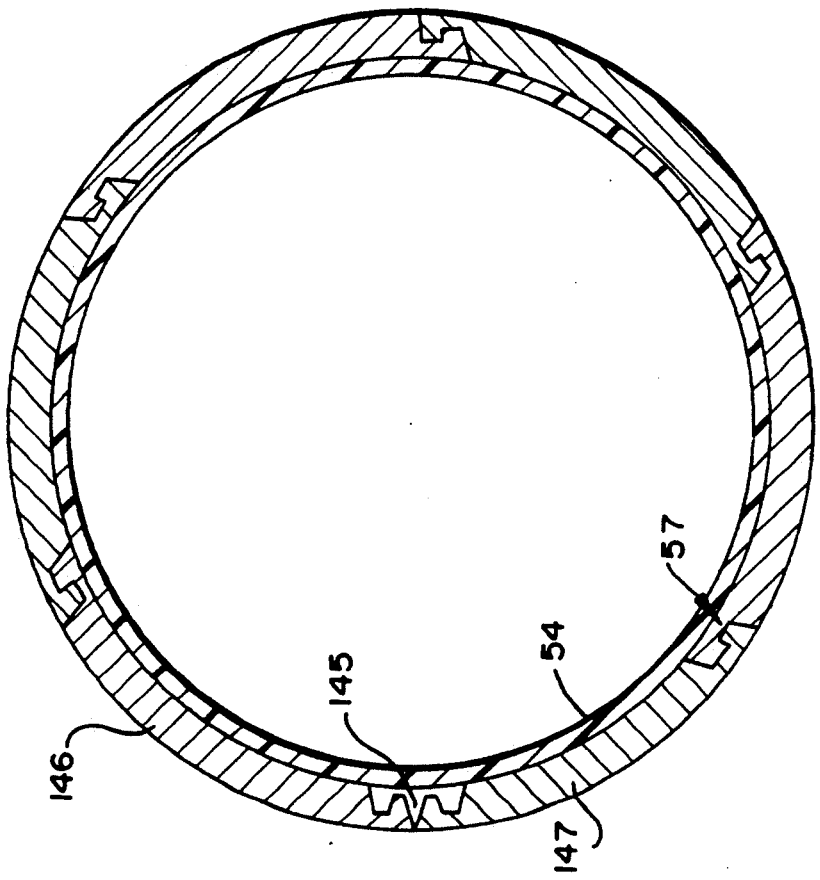
FIG. 14
FIG. 15

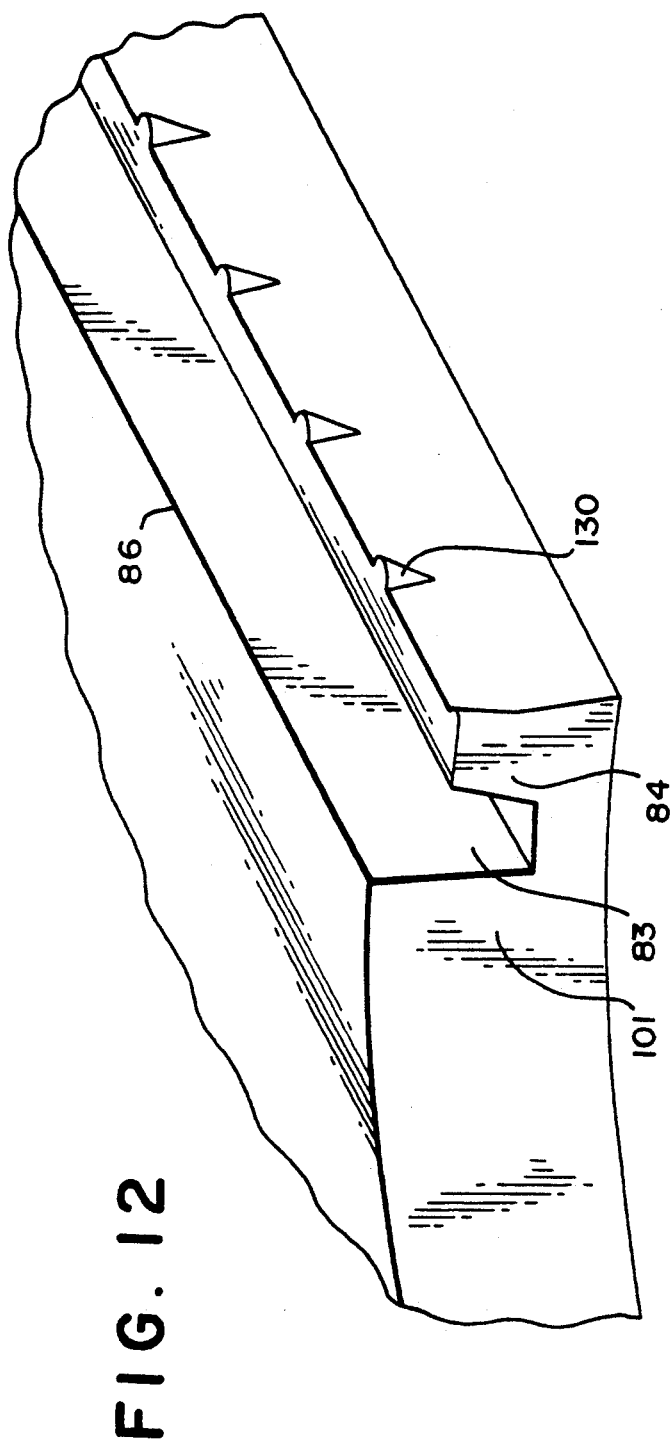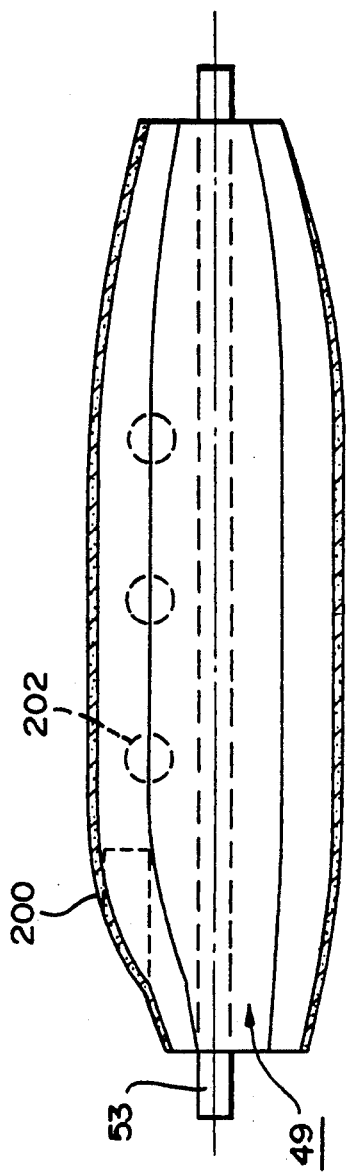

RIGID SEGMENTED MANDREL WITH INFLATABLE SUPPORT

TECHNICAL FIELD

The present invention relates to mandrels which are used as internal supports for the fabrication of hollow structures such as pressure vessels, cases for solid propellant rocket motors, fuel tanks, aircraft fuselages and the like. More precisely, the invention provides a reusable, collapsible mandrel for use in fabricating these structures from fibrous materials impregnated with a synthetic resin. These fibrous composite materials require a supporting member (mandrel) until the composite material is cured, at which time the supporting mandrel is removed through a relatively small opening.

BACKGROUND OF THE INVENTION

The manufacture of fibrous composite pressure vessels and rocket motor cases is accomplished by filament winding or by hand lay-up of the fibrous material impregnated with a synthetic resin on a mandrel or core which forms the internal configuration of the finished part. The mandrel, after the synthetic resin component of the fibrous composite is cured, must be removed. On tubular parts, such as fibrous composite pipe and similar structures, removal of the mandrel is not a particularly difficult procedure. However, on pressure vessels and rocket motor cases with restricted access due to the relatively small access ports common in such designs, removal of the mandrel from the finished part is a major design consideration for both the pressure vessel design and the mandrel design.

Other important attributes desired in mandrels for filament wound fibrous composite structures are light weight, stiffness, dimensional stability and low life cycle and/or recurring costs. Weight is important because it affects both the handling of the mandrel and its structure. A heavy mandrel requires large cranes, special handling fixtures and high capacity filament winding machines to rotate the large mass. If a mandrel segment weights more than 200 lbs, it can not be safely handled by workers inside a pressure vessel. Also, an incident, such as dropping a segment inside a pressure vessel, can easily damage the fibrous composite structure if the segment is heavy. Even moving a heavy mandrel assembly with an overhead crane entails a far greater risk if the assembly is heavy compared to a lightweight assembly. For instance, bumping into a stationary object is more apt to damage a fibrous composite structure on the mandrel if the assembly weights four times more than it would with a lighter weight mandrel.

Overall stiffness/rigidity and dimensional stability are also important requirements in a mandrel for fabrication of fibrous composite structures. While mandrel stiffness/rigidity are less of a factor when the structure or part being fabricated is processed in equipment which orients the assembly vertically, this approach is not practical when working with large and/or long parts, since it requires high ceilings in the processing bays. Access to the part by workers also is made more difficult due to the height factor. Stiffness and rigidity of the mandrel directly impact the quality of the fibrous composite part fabricated on the mandrel. Any movement of the mandrel while the fibrous composite material is being applied or anytime prior to polymerization (cure) of the resin system causes the fibers to move. This movement displaces the fiber from the desired path which changes the tension of the fibers and in severe cases may cause the fibrous composite material to actually wrinkle. All of these abnormalities significantly reduce the strength and performance of the finished part.

The ideal mandrel for filament winding fibrous composite structures has the following attributes: lightweight, collapsible so it can be removed from the finished part through small ports, rigid and dimensionally stable when assembled, and low life cycle and/or recurring costs. Over the years, numerous attempts have been made to produce the perfect mandrel. While some prior art mandrels have advantages over others, all have significant short-comings.

One prior art mandrel system designed to be easily removed is known as a washout mandrel. This mandrel is formed by packing a mixture of sand and polyvinyl alcohol into a female mold. After a low temperature cure, the polyvinyl alcohol (PVA) acts as a binder, holding the sand granules together. The sand/PVA mandrel can then be removed from the female mold, mated to a winding axis (shaft), and used as is or joined together with other sand/PVA segments to form a larger mandrel. The fibrous composite part is then fabricated, usually by filament winding, and the synthetic resin is cured. Following cure, the sand/PVA mandrel may be removed by spraying hot water into the mandrel which dissolves the PVA allowing the sand to be washed out. Thus, the term washout mandrel. The advantage of this type of mandrel is that it can be removed through a small opening in the finished part. The primary disadvantages are: 1) The weight of about 105 lbs. per cubic foot is very high which limits its use to smaller parts or to vertically-oriented processing to limit bending loads, 2) Fabrication of the mandrel is labor intensive, 3) For large structures the female molds used to fabricate the mandrels are expensive, and 4) The washout process produces a large amount of effluent which must be disposed of as a hazardous waste or treated to remove or reclaim the PVA. Innovations such as using hollow steel cylinders to reduce the volume of sand and PVA required, and replacing the sand with hollow glass microspheres have reduced the weight in some applications.

Segmented collapsible metal mandrels are used in two basic configurations. The first uses a layer of frangible plaster on top of the steel outside contour to form the final outside surface of the mandrel and thus the inside surface or contour of the part fabricated on the mandrel. The support structure of the segmented steel mandrel consists of a winding shaft, which defines the winding axis and is usually a thick walled steel tube that runs from one end of the part to the other and beyond to serve as the attachment point of the mandrel to the filament winding machine. Attached to this winding shaft are radial spoke supports which support the mandrel segments. These mandrel segments are usually made in three pieces which form the cylindrical section and both the forward and aft domes.

The number of segments used is determined by the size of the port they will be removed through after the part is fabricated and the weight which can safely be handled inside the part. The chord length of the mandrel segment can not exceed the diameter of the port from which it will be removed. Ordinary bolt and nut type fasteners are used to attach the mandrel segments to each other and to the winding shaft through the radial spoke supports. A plaster layer is then applied to the outside surface of the mandrel to meet the final contour requirements. In some instances, steel chains and cutting cables are imbedded in the plaster layer to aid in its later removal. This is followed by an oven drying step to remove excess moisture which can adversely affect the polymerization of some epoxy resin systems used in fabricating the part on the surface of the plaster layer.

Following fabrication of the fibrous composite part, the mandrel is removed by disassembling the fasteners securing the segments and supports to the winding shaft. The winding shaft is removed and a worker enters the mandrel and removes the fasteners securing the mandrel segments to one another and any internal support structure. In most cases, this requires persons standing on a temporary platform or with long arms. The mandrel segments are removed, one section at a time. After all the segments are removed, the plaster is broken out and removed. Pulling the chains which are sometimes imbedded in the plaster breaks the plaster free. Plaster removal is an extremely touchy process because the fibrous composite part is easily damaged by impact and the damage is often difficult to detect.

A major advantage of the segmented collapsible metal and plaster mandrel is that it allows for some design changes to the inside contour of the part by adjusting the outer plaster layer of the mandrel. The major disadvantages are its cost, weight and design limitations due to the need for internal access for disassembly.

Segmented collapsible metal mandrels are very similar to the metal and plaster mandrels without the plaster outer layer of the latter. Also, the former have the same attributes as the latter with the exception of not being able to change the outside contour to meet new design requirements. Because of this, metal mandrels are seldom used for development programs where design changes are likely. U.S. Pat. No. 4,448,628 to Stott, entitled Segmental Mandrel for Making Wound Filament Structures, is an example of the segmented collapsible metal mandrel technology.

Mandrels having segments made of composite materials instead of metal have found some limited applications for the fabrication of fibrous composite parts. An extremely important design requirement for a fibrous composite mandrel is that it must be rigid and not deflect, move or change shape under part fabrication and curing loads. Any undesired movement of the mandrel segments during part fabrication can result in deviations of the fibrous composite part from design characteristics and/or wrinkles in the fibers, all of which may have a significant negative effect on the structural integrity of the finished part. Also, tolerances required of the finished part are dependent on an accurate and rigid mandrel.

Composite structures are also fabricated by using an expandable (flexible) male member or mold to compress the fiber and resin composite material against an external female mold. The composite material is then cured while under pressure. For example, U.S. Pat. No. 4,822,272 to Yanase, et al., suggests a segmented male mold made from a super plastic alloy, such as one which contains 78% by weight zinc and 22% by weight aluminum. The alloy is rigid at room temperatures, but when heated to higher temperatures of approximately 180° C. (356° F.) exhibits plastic properties. In this concept, the male mold segments are precast from this superplastic alloy. These segments are then bolted or otherwise fastened together to form the male mold, which includes a central pipe member. After the fibrous composite material is applied to the outside surface of the mandrel, the assembly is heated with circulating hot gas or other fluid which passes through the inside hollow volume of the male mold. As the male mold is heated, the segments become plastic and apply pressure, via the heated pressurized fluid, to the fibrous composite part which is trapped between the male and female molds. After the resin has cured, the female mold segments are unbolted and removed, and the male mold segments are collapsed by application of a negative pressure to the hollow volume inside the male mold, allowing the segments to be removed through a relatively small port.

This approach has several serious drawbacks. The first is that the male mold segments are not reusable because removing the segments by plastic deformation destroys the segments, which greatly increases the recurring costs. Also, use of a zinc and aluminum alloy means that the male mold will not be dimensionally stable due to the high coefficient of thermal expansion (CTE) of these two metals. Zinc has a CTE of $15.2 \times 10^{-6}$ in./in./°F. and aluminum has a CTE of $13.0 \times 10^{-6}$ in./in./°F. Furthermore, once the segments become plastic, the interior dimensional tolerances of the part being formed are compromised. While this alone may not be a factor in all applications, it clearly limits the application of this concept.

Furthermore, expansion of an internal male mold during cure is not usually a desirable property because of the low strain capabilities of most carbon fibers. While it would be possible to use a resin which cures below the plastic point of the alloy, heating of the male mold to the plastic point for removal could damage the lower temperature resin. Another drawback is how the male mold segments are held in position for assembly prior to being fastened together. Although it appears from the drawings of the Yanase patent that this must be accomplished from the inside, this aspect of the male mold is not addressed.

U.S. Pat. No. 4,597,728 to McGlashen suggests an internal male mold assembly which is expanded by both a mechanical means and a fluid pressure inflatable bladder. McGlashen's male mold is designed to expand in two distinct stages. The first stage uses a rotatable iris to move the mold segments to a first position. Then an inflatable bladder is used to move the segments to a final outermost diameter for pressing the moldable composition against an outer female mold. Thus, the concept is for use in conjunction with an external female mold to apply consolidation pressure during cure of a part captured between the male and female mold assemblies. This approach could not be used to make a structure, such as a pressure vessel, which has limited internal access. Use of the male mold is therefore limited to the fabrication of fibrous composite tubes and similar structures which have at least one unrestricted open end. Also, the weight of McGlashen's mold assemblies would be substantial.

U.S. Pat. No. 4,889,355 to Trimble suggests the use of an expandable solid polyurethane foam as a male mold to aid in forming the seat and chain stay portions of a composite material bicycle frame. The function of this internal molding component is substantially different from that of the mandrel of the present invention. The Trimble male mold is used as an intermediate undersized support and to provide an internal pressing means.

The composite material is moved outward by expansion of the polyurethane foam and the composite material is thereby forced against the interior surfaces of an external female mold, causing the composite material to take the form of the female mold cavity during cure of the synthetic resin component of the composite material. Thus, the outer surfaces of the seat and chain stays are determined by the interior surfaces of the female mold. In other words, the male mold of Trimble does not define its own dimensional limits. Instead, these limits are defined by the interior surfaces of the female mold surrounding the mold cavity.

In marked contrast to the male mold assemblies of the prior art, the present invention provides a rigid internal mandrel which defines its own dimensional limits, as well as precise inside dimensions of the part being fabricated on its outer surface. The mandrel of the present invention therefore is designed to rigidly hold its form during part fabrication.

Furthermore, the expandable male mold as suggested in the Trimble patent cannot be removed as a practical matter and therefore remains in the part after its fabrication, whereas the rigid mandrel of the present invention is designed to be removed from the cured composite part with little effort. Thus, the present invention provides a temporary rigid support with fixed and precise dimensions only during fabrication and cure of the part.

DISCLOSURE OF THE INVENTION

The present invention overcomes the foregoing deficiencies of the prior art by providing an improved mandrel for use in fabricating fibrous composite shells, such as pressure vessels, rocket motor cases, aircraft fuselages, and other hollow structures, via filament winding, braiding, hand lay-up or other fabrication methods for forming such structures. When assembled, the segmented mandrel and inflatable support of the present invention is lightweight, rigid, dimensionally stable and uses no internal mechanical supports or fasteners. The mandrel may be used for, but is not limited to, fabricating pressure vessel type structures with small port openings, such as rocket motor cases. With no internal mechanical supports or fasteners, the mandrel may be disassembled and removed without entering the part, if desired. This allows the use of smaller ports in pressure vessels and other structures increasing the strength and utility of such designs.

The invention uses a plurality of longitudinal sector pieces or segments which are connected by longitudinally extending joints comprising transversely overlapping and interlocking elements, generally in the form of a ridge received in a corresponding groove. The joints are designed to allow for assembly of the segments from the inside to form the outside surface of the mandrel. A key segment is used to join the first and next-to-last installed segments together and thereby to complete a peripheral wall around a hollow chamber. One or more fluid inflatable bladders are placed inside the hollow mandrel formed by assembly of the segments, and are used to apply a positive pressure from within the interior chamber to push outward against the plurality of segments and lock them in a rigid position.

The design of the overlapping and interlocking joint elements used in joining the segments is such that the application of the positive pressure from the bladders causes the segments to lock together, creating a rigid monocoque mandrel structure the outside surface of which carries the structural loads. Adapter plates are attached to the forward and aft ends of the mandrel shell and have spindles or shafts to interface with filament winding or other desired fibrous processing equipment. The adapter plates may be attached by bolts or the like to the ends of the segments.

Even though the outside diameters of most pressure vessels, rocket motor cases and aircraft fuselages are relatively large, use of the monocoque mandrel of the present invention results in a very rigid (stiff) mandrel structure. This is especially significant when compared to current prior art mandrels which use a relatively small (less then 10 inches in diameter) longitudinal steel tube (shaft) to carry all of the loads.

After an uncured composite part has been formed on the mandrel, the resin used to bond the fibrous composite together is cured to complete fabrication of the part. The mandrel is then ready for removal. With this invention, the process is very simple. First, each internal bladder is deflated. Next, the adapter plates on the forward and aft ends are removed by removing the fasteners used to attach the adapters to the segments. Each bladder is then removed allowing the key segment to be removed. Compressed air applied between the segment and the part, or a pulling force applied to the end of the segment, is all that is required to free the segment from the assembly. The freed segment is thereafter removed through a port or other opening in the part. The remaining segments are freed and removed in a similar fashion in reverse order from the order used during assembly.

The number and size of the longitudinal segments used in the invention depend on the size and configuration of the part being fabricated on the mandrel. The smaller the access port and the larger the diameter of the part, the greater the number of smaller segments required. For example, a 48 inch diameter part with a 16 inch diameter port would use 12 or more segments.

The bodies of the mandrel segments are made preferably of a fibrous material impregnated with a moldable synthetic resin. The synthetic resin is preferably an epoxy type resin with a heat activatable hardener component. Such fiber and synthetic resin material in an uncured or partially cured state is commonly known as "prepreg". The fibers may be in the form of either a woven fabric or unwoven, unidirectional unwoven fibers arranged in one or more layers being preferred. Different layers also may have different types of fibers and/or fiber and/or resin compositions. For example, the fibrous material may comprise glass fibers, KEVLAR fibers, SPECTRA fibers, carbon fibers, or mixtures thereof, unidirectional carbon fibers being preferred. KEVLAR is a trademark of DuPont for its proprietary aeromatic polyamide fibers, and SPECTRA is a trademark of the Allied Fibers Division of Allied Signal, Petersburg, Va., for its proprietary polyethylene fibers.

The bodies of the segments are preferably fabricated from carbon/epoxy composite materials with aluminum being used for the interlocking joint elements. While the segments also may be fabricated entirely from a metal, such as steel or aluminum, carbon/epoxy composites are the materials of choice for the central body portions of the segments. The segments also may be made entirely of such composites.

Due to the high strength and anisotropic properties of carbon/epoxy composite materials, the strength and thermal properties of the mandrel can be catered to the particular application. Also, there are many different carbon fibers and resin systems available, allowing the selection to be made based on a particular property such as strength, stiffness, compliance and even electrical resistivity. This results in the lightest, strongest and most accurate mandrel possible. It is envisioned that, in some applications, longitudinal compliance of the segments may be an attribute and aid in their removal from the finished part. The aluminum joint elements can be either bonded during molding of the segments or bonded in place later (secondarily).

While numerous other joint designs are possible, only three basic types are described here. Each joint follows the opposing side edges of the two curved and tapered mandrel segments and the opposing joint elements are oriented to overlap and interlock in a direction normal to the adjacent segments at all times. The first basic type is the common joint and is used for all segment to segment interfaces with the exception of those of the key segment. This is because the joint elements along either side of the key segment are designed to engage corresponding joint elements of the two adjacent segments simultaneous when the key segment is moved into place. The other segments are engaged only with one adjacent segment at a time during assembly. Both types of joints are designed to prevent movement in two directions, namely, radially outward and circumferential apart. Movement of the segments radially inward is prevented by the outward pressure applied by the internal bladder(s), which is controlled by internal bladder pressure. Some movement may still be possible between the segments longitudinally. However, such longitudinal movement (shear) is severely limited by the shape of the joints in the dome areas at opposite ends of the segments, by the adapter plates which connect all the segments together at the forward and aft ends, and by the optional longitudinal winding shaft when one is used.

Another embodiment of this invention utilizes a longitudinal key piece to secure the first and last installed mandrel segments together instead of the aforementioned key segment embodiment. This approach allows for the assembly of all the mandrel segments and closure of the periphery of the mandrel prior to bladder installation and pressurization. Furthermore, use of a key piece as the locking piece allows the mandrel segments to have radially aligned sides, and not acute angled sides. This simplifies the design, fabrication and assembly of the mandrel segments and their respective joints. While several different configurations may be used for the cross-sectional shape of the key piece, it is believed that a three triangle design with a larger center triangle bordered on each side by two smaller triangles represents one of the most practical designs. All other parts and functions of the mandrel invention remain as previously described.

Two other embodiments have special features to prevent longitudinal movement (shear) between adjacent segments because such movement could become a design problem when making longer parts where bending loads are higher and also in applications were torque loads transmitted through the mandrel are a consideration. One of these alternative embodiments uses a joint design which incorporates a protrusion extending transversely from a longitudinal fin element having a corresponding recess in the receiving joint element. This design, or a similar one, positively prevents longitudinal movement (shear) between the segments.

Another alternative embodiment uses springably or resiliently mounted dowels which, when activated, cause rigid engagement between the two adjacent mandrel segments by pressing the dowels of one segment through corresponding seats of the other segment located within the interlocked joint therebetween. This locks the mandrel segments in a fixed longitudinal position relative to each other and resists all longitudinal movement until the dowels are disengaged. In this embodiment, the engagement of the dowels is caused by the internal bladder pressing against a pad on one end of a dowel pin. Through the use of levers and/or pads with sufficiently large surface areas, the dowels may be engaged by relatively low bladder pressures while still subjected to a high disengagement spring force to prevent the dowels from sticking or otherwise remaining in the engaged position. Bladder engaged and resiliently biased dowels provide this mandrel embodiment with the ability to be adapted to applications with high mandrel loads while still maintaining the important attributes of no internal fasteners, no internal support structure and ease of disassembly.

While use of an interlocking longitudinal joint to engage the adjacent mandrel segments is the preferred approach, it is also possible, and in some applications may be advantageous, to use common tooling dowels as the method of engaging the adjacent segments. A bushing is located in one mating segment and a mating tapered pin is located in the other mating segment. The corresponding pin and bushing are engaged during assembly in the same manner as the interlocking longitudinal joint elements. While this approach provides a very accurate mating of the adjacent segments, assembly of the mandrel is more difficult because the dowels allow less longitudinal movement of the segments during assembly.

A further embodiment utilizes sacrificial external hoops to reduce the joint loads in applications where higher than normal internal bladder pressures are necessary and/or desired or when it is advantageous and/or the design warrants the use of a small number of segments with a large chord dimension. One or more circumferential hoop wraps of continuous high strength fiber composite materials are wrapped in grooves around the outside surface of the mandrel. These hoop wraps counteract the radial outward pressure of the internal bladder to reduce the circumferential loads on the interlocking joints. The number and size of the hoop wraps used depends on the mandrel size, the loads being counteracted and the strength of the fibers used. Continuous unidirectional fibers, preferably of carbon, are preferred. After the part is finished and the mandrel removed, the external (to the mandrel) hoop wraps are easily removed from inside the part.

While the invention may use end-dome spindles instead of a longitudinal winding shaft passing entirely through the mandrel, it is desirable, in most cases, to use the latter. Due to the monocoque nature of the present invention, the winding shaft is lightly loaded. In other words, the major loads are carried through the walls of the mandrel segments, which together serve as an exterior load bearing peripheral wall or skin. Because of this, the winding shaft may be small in diameter and of hollow cross section, such as a pipe made of thin walled steel or even aluminum. This is unlike prior art mandrels which require a large and heavy steel winding shaft because the mandrel loads are carried almost entirely by the shaft.

The reusable bladder, which is utilized to apply the internal pressure that holds the interlocking segments in place, may be fabricated from several materials depending on the service temperature. Heat sealed nylon film is the lowest cost approach. While a bladder made of nylon film could be reused, experience has shown that this material is often damaged in use. The most preferred material is a silicone elastomer. The bladder may be vulcanized as a unit or constructed by using precured silicone material with uncured joints which are later vulcanized. The bladder means may be a one piece bladder or made up of several individual bladders on a common manifold to maintain a consistent pressure between the several bladders. Several smaller bladders may be easier to handle for the larger mandrels.

The internal bladders used to pressurize the inside of the mandrel and hold the segments in place can be filled with a gas such as air or nitrogen. Since the internal pressure is preferably very low, i.e., around 15 psig, this does not present a safety problem. Liquids, such as oil and water may also be used as a pressurizing fluid, but due to the increased weight and energy required to heat these materials, they are not the most viable choice. Another material which may be used as a pressurizing fluid is compressible silicone rubber. This material is marketed under the trade name X5-8023 by Dow Corning Corporation, Midland, Mich., USA, and is a particle silicone rubber that when subjected to pressure behaves like a flowable gel. Down Corning X5-8023 has a specific gravity of 0.98, so it is a little lighter then water and may be easier to use in this application. No matter what fluid is used to pressurize the bladder system, it is preferable to use a pressure regulating system to maintain a substantially constant pressure during the cure cycle.

In a further embodiment (not shown), a microprocessor controlled "active" system may be used to control the pressurization of the internal bladder(s). This control also may be provided manually in response to visual pressure gauge readings. Analysis has shown that the strain levels in the joints are significantly reduced when the internal bladder pressure is equal to, or slightly higher than the external pressure being exerted on the outside of the mandrel. By placing a strain sensing device between the key segment and an adjacent segment, across the interlocking joint, the radial strain between these segments may be sensed. By inputting this strain data into a microprocessor programmed to measure and respond to the level of this strain by increasing or decreasing the pressure in the internal bladder(s), the strain on the interlocking joints may be kept to a minimum. This technique may be extremely beneficial in autoclave curing applications where the external pressure on the mandrel could be very high. The advantage of this embodiment is that the ideal internal bladder pressure is adjusted automatically to meet current mandrel requirements.

The invention allows for the use of numerous concepts to supply heat to the mandel for cure of the resin component of the fibrous composite part. The part also may be cured in an oven or autoclave is used, the mandrel must be designed to accommodate the increased external pressure. Due to the unique design of this invention, some uncommon methods may be used to provide heat for curing the part. A hot gas, under pressure, may be circulated in the internal bladder(s) to provide heat to the part. While the heat would have to travel through the mandrel segments to reach the part, this is a very efficient method of supplying heat. The outside of the part may be wrapped with an insulation blanket to further control the heat loss.

Another heating method unique to this invention is to use silicone rubber flexible heaters as an integral part of the internal bladder system. Silicone rubber heaters are silicone rubber sheets which have resistance elements molded therein. These heaters may be used as outside surface elements of the bladder(s), which make intimate contact with the inside surface of the mandrel segments. While heaters of this type are often used on fibrous composite parts, the ability to press the heaters tightly against the inner surface of the mandrel substantially increases the heat transfer. Such pressure can not be applied when using these heaters on the outside of the part without causing wrinkles in the fibrous composite part. This internal heating method, or one of the others cited, is desirable since it eliminates the need for an oven or autoclave, thus reducing capital equipment costs. Electrical resistance heating methods are easily adapted to this invention because each of the mandrel segments is a single piece. This makes it easy to provide an electrical path from one end of the mandrel to the other since no intermediate connections are required. Several methods could be used for resistance heating of the segments. The most preferred method is to embed an electrical resistance heating wire, such as nickel-chromium, in the composite segments when they are fabricated. Another approach is to embed small tubes in the segments during fabrication and then to install the heating wire in the tubes at some later time. Instead of a heating wire, a hot fluid may be circulated through such tubes. In yet another approach, the carbon fibers used to fabricate the segment may be used as a resistance heating elements provided a means is incorporated during fabrication to attach the necessary electrical power to the fibers.

Carbon fibers have been shown to be good receptors for induction heating. Because of this, it is possible to heat the mandrel using induction heating technology, provided the segments are made of a carbon fibrous composite. Induction heating may also be used where the segments are made of metal. Composite segments with aluminum joint elements may cause some variations in heat intensity, but this is much less of a problem than that presented by the internal support structure required for the mandrel segments of prior art mandrels, such as overheating of massive winding shafts.

BRIEF DESCRIPTION OF THE DRAWINGS

A better understanding of the invention and its advantages will be apparent from the detailed description given below of specific embodiments, which are described in conjunction with the accompanying drawings in which:

FIG. 4 is a perspective partially sectioned and exploded view of a mandrel in accordance with the present invention;

FIG. 5 is a transverse sectional view of the mandrel of FIG. 2 taken along lines 5—5;

FIG. 6 is a fragmentary front elevational view in section showing details of an interlocking joint;

FIG. 7 is a fragmentary front elevational view in section showing a key segment and its interlocking joints;

FIG. 8 is a side elevational view of the mandrel of FIG. 2 positioned for transport in an assembly and transportation cart;

FIG. 10 is a fragmentary perspective view in section showing a mandrel segment of laminated construction;

FIG. 11 is a perspective view in fragmentary section showing a mandrel segment of modified construction wherein the interlocking joint has locking pins;

FIG. 12 is a perspective view in fragmentary section showing a mandrel segment joint with a shear locking feature;

FIG. 13 is a fragmentary cross-sectional view showing a further modification of the interlocking joint wherein the mandrel segments are interlocked with a dowel pin and bushing;

FIG. 14 is diagrammatic view in cross section showing a modification of the mandrel segments for using a longitudinal key piece instead of a key segment;

FIG. 15 is a diagrammatic perspective view illustrating use of a transverse key piece to interlock subsegments wherein each longitudinal primary segment comprises two subsegments;

FIG. 17 is a side elevational view of a mandrel in accordance with the present invention having a frangible coating (shown in section) for filament winding to make an aircraft fuselage;

DETAILED DESCRIPTION

Figure 1:
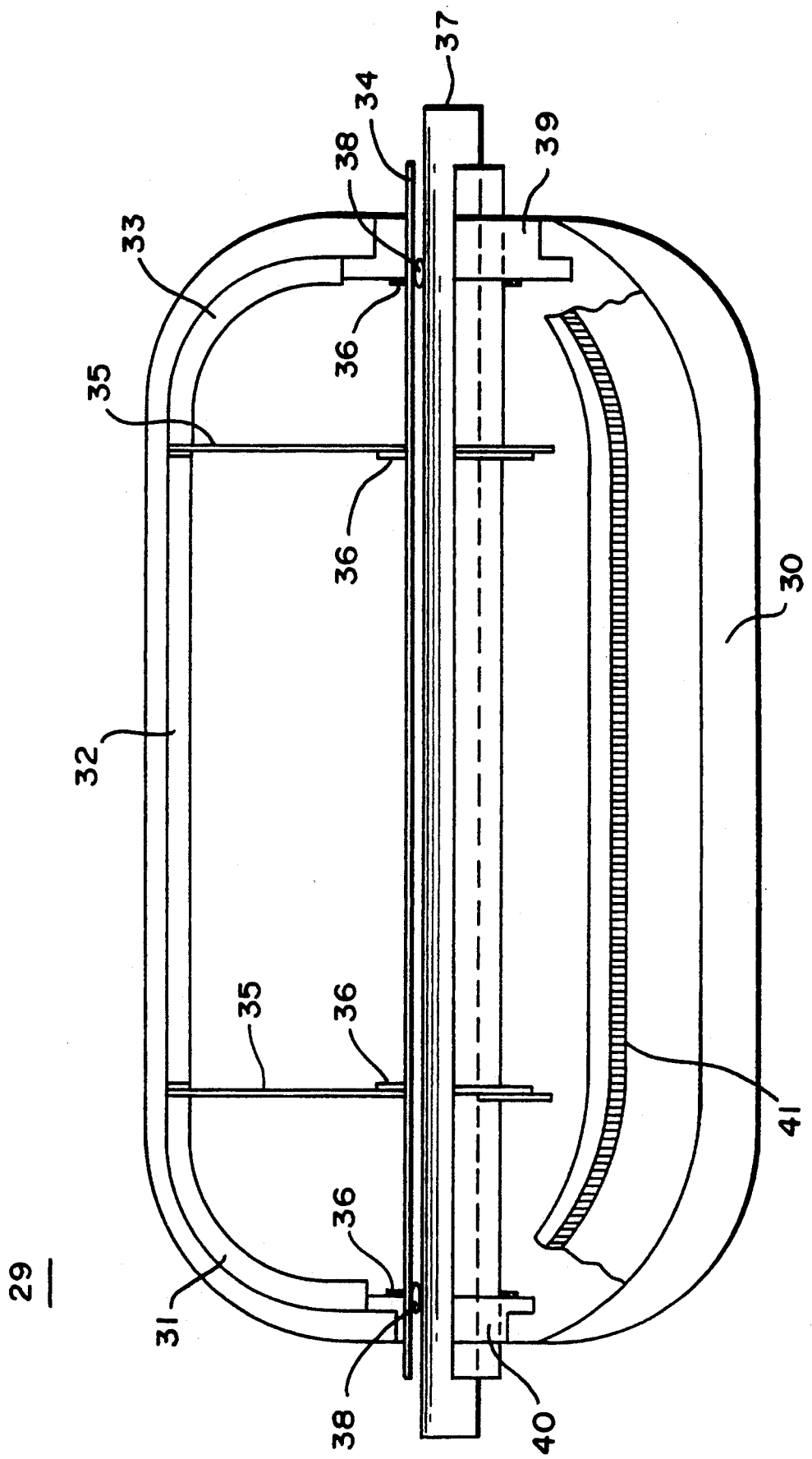
FIG. 1 is a side elevational view of a prior art mandrel with four sector segments removed to expose the internal support structure.

A conventional segmented collapsible steel/plaster mandrel 29 is shown in FIG. 1 of the drawings and comprises a plurality of longitudinal segments 30 each made up of a forward sector section 31, a center sector section 32 and an aft sector section 33. These sector sections and segments are bolted together at their lateral and longitudinal flanges to form the periphery of the mandrel support structure which is fixedly attached to an outer winding shaft 34 through flanges 36 and bolts (not shown) at the aft adapter plate 39 and forward adapter plate 40. The plurality of segments is also supported by a plurality of radial spoke supports 35, which are attached by bolts (not shown) to flanges 36 on the outer winding shaft 34 and are also fixedly bolted to the segments 30. A spoke is required for at least every segment and, except for very short mandrels, at least two spoke assemblies are required to support the cylindrical section of the mandrel. On mandrels with long cylindrical sections additional spoke support assemblies are required.

Assembly of this prior art mandrel requires one or more workers to enter the hollow section of the mandrel and install and secure all the bolt type fasteners used to hold the sector sections and mandrel segments together, and attach the spoke supports 35 both to the mandrel segments 30 and to the flanges 36 on the outer winding shaft 34. An inner winding shaft 37 is connected to the outer winding shaft 34 by two load bearing ball joints 38. The final outside contour of the mandrel is formed by a shell 41 which may comprise a layer of frangible plaster applied while the mandrel assembly is rotated in a fixture. On the plastering fixture is mounted a template machined to the desired outside contour of the finished mandrel. The plaster is built up in successive layers until it conforms to the template. It is obvious to one trained in the art that assembly of this type of mandrel is a labor intensive operation and the design is restricted to use in manufacturing products which are sufficiently large enough to allow for a person to work inside to assembly and disassemble the mandrel.

Also, due to the heavy weight of mandrels of this design, special and expensive designs must be incorporated to reduce bending stresses which would crack the plaster and/or cause excessive distortion of the fibrous composite part being manufactured. One of these special design features is the use of two winding shafts, an outer shaft 34 and an inner shaft 36, supported by a ball joint 38. The sole purpose of this complex arrangement is to reduce bending stresses in the mandrel. Disassembly of this type of mandrel entails removing the bolts attaching the spokes 35 to the winding shaft flanges 36 and removing the winding shaft assembly parts 34, 36, 38, 39 and 40. Entering the inside of the mandrel and removing all of the bolts attaching the spokes to the segments 30 and the segment sector pieces to one another and then removing the segment sector sections 31, 32, 33 one at a time. The plaster 41 is now ready to be broken out from the inside of the finished part (not shown).

Figure 2:
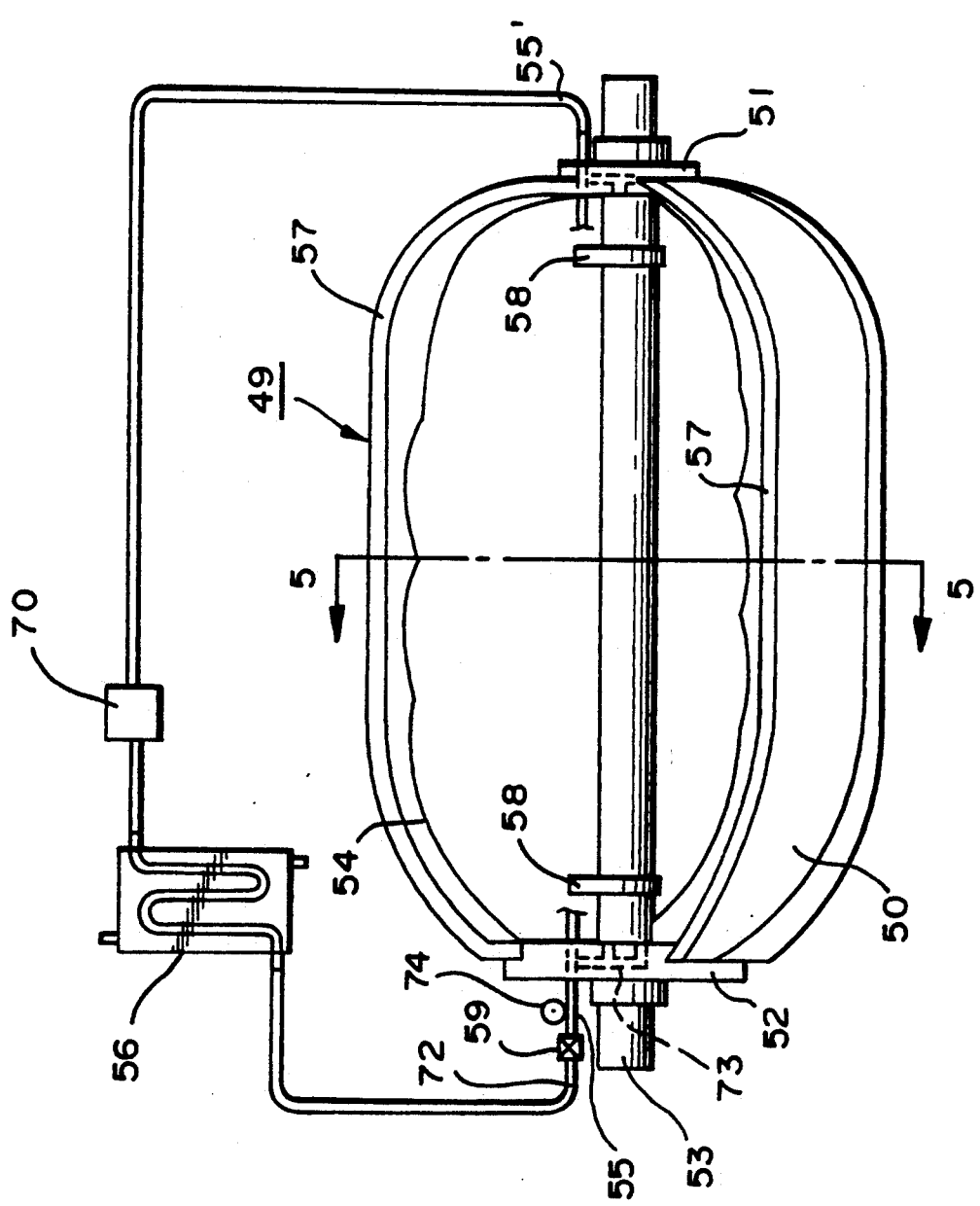
FIG. 2 is a side elevational view of a mandrel in accordance with the present invention with four sector segments removed to expose the internal support structure.

In FIG. 2, there is shown a mandrel 49 made in accordance with the present invention. This mandrel comprises a plurality of longitudinal segments 50 which fit together at their longitudinal edges by interlocking joints and are attached with bolts at the forward and aft ends to a forward adapter plate 51 and on aft adapter plate 52. These adapter plates are fixedly attached to a hollow winding shaft 53 by tooling pins. Three fluid inflatable bladders 54 (only one being shown for clarity) fill the hollow section of the mandrel formed by the plurality of segments 50, and each bladder is filled with compressed air, nitrogen or other fluid via a fluid inlet 55 and a common manifold 73 in adapter plate 52. Each bladder 54 is secured to winding shaft 53 by a pair of straps 58,58.

What is readily apparent to one trained in the art is the small number of pieces required by this invention when compared to the prior art as shown in FIG. 1. A further understanding may be obtained by studying the more detailed description which follows.

Figure 3:
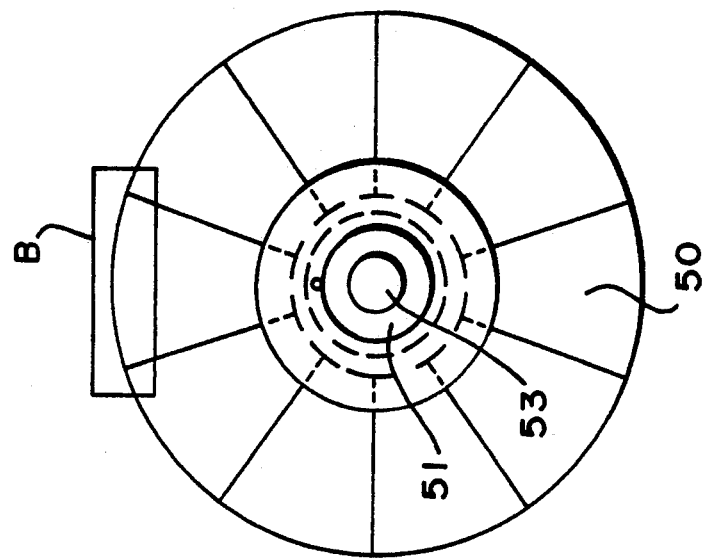
FIG. 3 is an end elevational view of the mandrel of FIG. 2.

The mandrel 49 as shown FIGS. 2-4 illustrates attachment of the aft adapter plate 52. This plate is slidably mounted on the winding shaft 53 by an integral sleeve 67, and when in proper position rests in a sector annulus formed by the assembly of segments 50 and is fixedly attached to the winding shaft 53 by passing tooling pin 60 through aperture 61 in sleeve 67 and corresponding aperture 62 in shaft 53. The adapter plate 52 is fixedly attached to the mandrel segments with shoulder bolts 64 which pass through apertures 65 into corresponding threaded receiving apertures 66 in the mandrel segments 50. A similar arrangement is used to attach the forward adapter plate 51. At least two bolts 64, each with corresponding apertures 65 and 66, are used to attach each segment 50 to the respective adapter plate 51 or 52.

FIG. 5 shows the mandrel 49, the winding shaft 53 and the bladder 54 in cross section as taken along lines 5—5 of FIG. 2. In this figure, the bladder 54 (enlarged for clarity) is fully inflated to lock the assembled segments 78, 79, 80, 81, 87 and 89 securely and rigidly in place. Those skilled in the art will understand that key segment 89 will have been the last segment placed into its assembled position before inflation of bladder 54. Although each of the segments may be made of metal as indicated by the cross hatching shown in this figure, these segments may be made of a composite material, such as the carbon fiber/epoxy resin composite material previously described.

FIG. 6 is a detail of the cross-sectional area A in FIG. 5 showing one design for the common interlocking joint used to join the segments 78, 79, 80, 81 and 87 to one another along their longitudinal edges. For example, the joint between segments 81 and 87 consists of a tapered lip 82 and a receiving groove 85 on segment 87, and a tapered lip 84 and a receiving groove 83 on segment 81. When the two segments 80 and 81 are being joined together, the tapered lip elements 82 and 84 slidably engage the corresponding receiving grooves 83 and 85, thereby joining the segments 81 and 87 together. It is obvious to one trained in the art that this joint design with its over/under interlocking design may be used for all segments, except for the joints on the key segment which goes into position last. The angles between the sides of these lips and grooves and the contiguous peripheral surface of the segment may be perpendicular or acute, the acute angles illustrated in FIG. 6 being preferred to increase the interference between the segments at their common joint as the segments are pushed or biased outward as the bladder 54 is inflated. The proper selection of these angles may avoid the necessity of utilizing external hoop bands to insure the rigidity of the outer surface of the mandrel. The angles being described here are represented by the angle 88 shown in FIG. 6. Angle 88 is preferably in the range of 55° to 85°, more preferably 65° to 75°, and most preferably about 73°.

As seen best in FIG. 7, which is a detail of the cross-sectional area B of FIG. 3, the key segment 89 utilizes a different joint design from the one used on the common segments. To allow installation and removal of the key segment from the inside of the mandrel all angles used in the joint are acute to the radial to allow the key segment to be pulled free easily from the adjacent segments. FIG. 7 shows the key segment 89, the right adjacent segment 78 and the left adjacent segment 87. The key segment 89 has two lips 90 and 93 and two grooves 92 and 94. These lips and grooves correspond with mating portions on the corresponding right segment 78 and left segment 87. The groove 85 receives lip 93 and lip 82 is received by groove 94. This order is maintained on the left side where lip 90 is received by groove 94 and lip 91 is received by groove 92. By keeping the sides of these lips and grooves substantially parallel to each other and maintaining the joint parallel to the outside surface of the mandrel, the key segment may be installed from inside the mandrel and also removed from inside the mandrel. Preferably, the sides of these lips and grooves are substantially parallel to the axial plane radially bisecting the key segment.

The key segment 89 is held in position by a pressure differential between the inside and outside of the mandrel established by pressurizing with a fluid the bladder 54 positioned inside the mandrel. This pressure differential holds the key segment in position and causes the mandrel segments forming the periphery of the mandrel to perform as a ridged monocoque structure. Unlike other winding mandrels, with this invention the segments forming the periphery (outside surface of the mandrel) support the loads incurred during use with no internal bracing or similar support structure commonly found in winding mandrels of this general type.

The joints need not be longitudinally continuous. Depending on the application, it may be advantageous to have a plurality of longitudinally interrupted joint elements with a longitudinal gap between each. This gap could be very small, such as 0.010 inches, or as large as several inches. All that the invention requires is that there be sufficient joint structure interconnecting the segments to carry the loads between the segments without significant flexure or failure of the joint. However, it is believed that a continuous joint provides the best means of carrying the joint loads and at the same time maintaining the desired rigidity of the mandrel assembly.

FIG. 8 shows an assembled mandrel in accordance with this invention on an assembly and transport cart 160. During assembly, the lower mandrel segments are supported by the two contoured saddles 166,166 while they are secured to the winding shaft 53. The cart 160 consists of a frame assembly 161 with casters 162. Fixedly attached to the frame are two winding shaft supports, a forward support 163 and an aft support 164. These supports hold the winding shaft 53 and adapter plates 51, 52 in proper alignment, and allow the shaft to be rotated or locked in position. Caps 165 hold the winding shaft 53 in place on the supports. Although winding shaft 53 is shown as extending longitudinally through the mandrel 49, it may instead consist only of two end stubs, one extending axially outward from each adapter plate.

The two contoured saddles 166,166 are movably vertically and are attached to the frame assembly 161. These saddles are designed to conform to the outside contour of the assembled mandrel and are used to support the mandrel during assembly and to support the finished part during disassembly of the mandrel. The saddles move vertically to support the individual mandrel segments for assembly as mentioned and may be lowered to allow the assembled mandrel portion and/or the finished part to be rotated. The saddles also may be positioned to support the finished part during disassembly of the mandrel, which requires a lower height than the mandrel assembly position to allow for the thickness of the finished part. Following assembly and pressurization of the internal bladder, the mandrel is supported by the winding axis shaft supports 163 and 164 located at the forward and aft ends of the cart.

Figure 9:
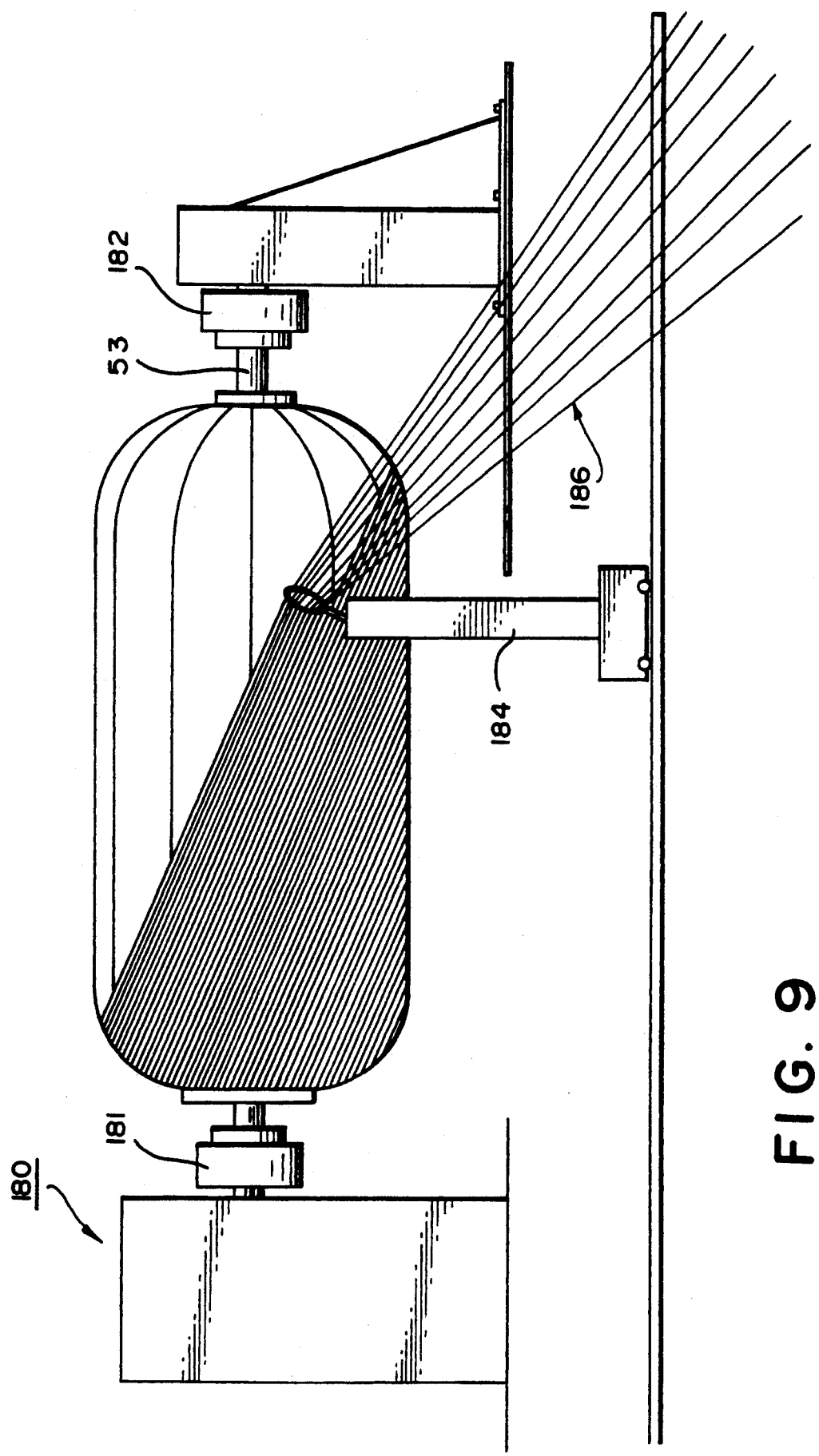
FIG. 9 is a diagrammatic elevational view illustrating the mandrel of FIG. 2 positioned in a filament winding machine.

FIG. 9 depicts the mandrel 49 positioned in a filament winding machine 180, to which it has been transported by cart 160. The assembled mandrel is supported in the filament winding machine by standard machine tool type chucks 181 and 182 located at the drive and tail stock ends, respectively. The chucks attach to the winding shaft 53 of the mandrel. A carriage portion 184 dispenses fibrous composite material 186 in continuous roving form to the mandrel. The rotation of the mandrel and the forward and aft traverse of the carriage 184 are synchronized, and it is this which determines the angle at which the composite material is applied to the mandrel for forming the structure of the finished part. Following completion of the filament winding process, the mandrel is removed from the filament winding machine and the composite material is cured by heating the part and the mandrel in an oven or the like. Following cure, the mandrel is removed from inside of the part.

FIG. 10 is a view showing the construction of a typical mandrel segment and a typical interlocking joint as used in this invention. The interlocking joint elements 100 and 101 have arms 103, 102, 105, and 106 respectively which form grooves 104 and 107, which have outwardly converging sides and in which edge portions of the composite segments are attached by adhesive bonding. In the preferred embodiment, the joint elements 100 and 101 are extrusions of 6061-T6 or a higher strength 7000 series aluminum alloy. The joint elements 100 and 101 are bonded to the laminated or multiple layer carbon/epoxy composite structure of each segment body 110 using a high strength, high temperature epoxy adhesive such as EA 9351 available from the Hysol Division of the Dexter Corporation, Pittsburg, Cal. The composite segment body portion 110 is fabricated from a plurality of plies or layers of woven carbon fiber fabric impregnated with a high temperature epoxy resin such as TOOL/RITE MXG-7620 available from the Fiberite Company, Tempe, Ariz.

The number and angle of plies used to form the body of the segment are determined based on the particular application. However, by using composite materials to fabricate the segments, it is possible to tailor the strength and stiffness/compliance to meet the needs of each application. It is even possible to design the segments with longitudinal compliance, which in some applications, would assist removal of the segments from the finished part. Also, with composite materials, it is possible to adjust the thermal properties of the segments, and thus the mandrel, within certain parameters. It will be apparent to those trained in the art that the segments 81 and 87 could also be fabricated with integral joint elements 100 and 101 either as all metal or all carbon composite structures.

In some applications, especially those which do not use a through winding shaft, it may be necessary to provide a means to prevent relative longitudinal movement (shear) between the adjacent segments. One such embodiment, as shown in FIG. 11, uses a pin element 120 which is slidably mounted in an aperture 121 located in joint element 101. The pin 120 has a cap 122 and a spring 123 which keeps the pin in a normally unengaged position 122, when the bladder is not fully inflated, as shown by broken line 54, so it does not hinder in anyway the assembly of the segments. After the mandrel is assembled, the inflation of the bladder 54 presses on the cap 122 and causes the pin element to slidably engage the receiving aperture 124 in joint 100. Once the pin 120 and aperture 124 are engaged, the segments can no longer move longitudinally (shear).

Releasing the pressure on the bladder 54 causes the pin to retract from aperture 124. The amount of pressure in bladder 54 required to engage the pin element 120 depends on the strength of the spring 123 and the surface area of the cap 122. With this design, it is possible to control the timing of the pin insertion to coincide with a particular strain load on the joints. It will be obvious to those trained in the art that many configurations of pin elements, apertures, caps, levers, springs, resilient levers and the like could be used to fixedly engage the adjacent segments to prevent both shear and lateral movement.

Another embodiment to prevent longitudinal shear between the segments is depicted in FIG. 12. This embodiment involves convex and tapered protrusions 130 on the outer edge of lip 84 which engage corresponding concave and tapered slots (not shown) in the edge of the adjacent joint element. The size, shape and number of these protrusions may be varied, depending on the requirements of each particular application.

FIG. 13 shows another method for interlocking or jointing the mandrel segments together in accordance with this invention. This embodiment uses a pin and bushing arrangement to align and engage the corresponding segments. The right segment 171 has a tapered pin element 172 and a step element 175. These elements correspond and engage with similar elements in the adjacent left segment 173 which are a bushing element 174 and a step element 176. The bushing element contains an aperture which accepts the corresponding pin element 172. When these elements are engaged and held in position by the pressurized bladder, the mandrel segments are fixedly held in position and not allowed to move in any plane, which causes the invention to function as described previously. While it is believed that a mandrel in accordance with this embodiment would perform better when this method of interlocking the segments (joints) is utilized, it is felt that the cost of such a mandrel would be significantly higher than when the longitudinal joint method is used due to the greater number of pieces required and a higher degree of precision required in the overall mandrel assembly. Furthermore, it is believed that such an mandrel would be far more difficult to assemble and disassemble due to less freedom of movement available between the segments prior to total engagement of the interlocking segments.

A further embodiment of the invention is illustrated in FIG. 14 which is a transverse cross section of a six segment mandrel. This embodiment uses a longitudinal key element 145 to engage the two adjacent segments 146, 147. The lip like elements are designed to fixedly hold the adjacent segments in place with the outwardly acting force provided by the internal bladder 54. Like the key segment concept, the longitudinal key element or piece is designed to be installed and removed in line with an axial plane.

FIG. 15 illustrates the use of a transverse key element 190 to engage and join two longitudinal subsegments 187 and 188 of a main mandrel segment 189. The cross section of transverse key element 190 is identical to that of longitudinal key element 145 also depicted in FIG. 14, only in this embodiment key element 190 is in two sections 191 and 192 which abut at a transverse joint 195 parallel to longitudinal joints 57. The key element 145 is still used to join the main segments along their adjacent longitudinal edges. The advantage of a transverse key element is that it allows for the use of shorter longitudinal subsegments, which facilitates the removal of the mandrel segments from smaller access ports. This may be necessary in large diameter structures with relatively small ports where the curvature of the mandrel segments could cause interference and hinder removal. Also, main segments with smaller subsegments allow for removal from smaller non-standard ports not located at the forward and/or aft ends of the part. For example, an access port could be located in, or even cut into, a cylinder area away from the forward and aft domes. This approach could expand the application of filament winding technology to new areas by providing increased design flexibility.

Figure 16:
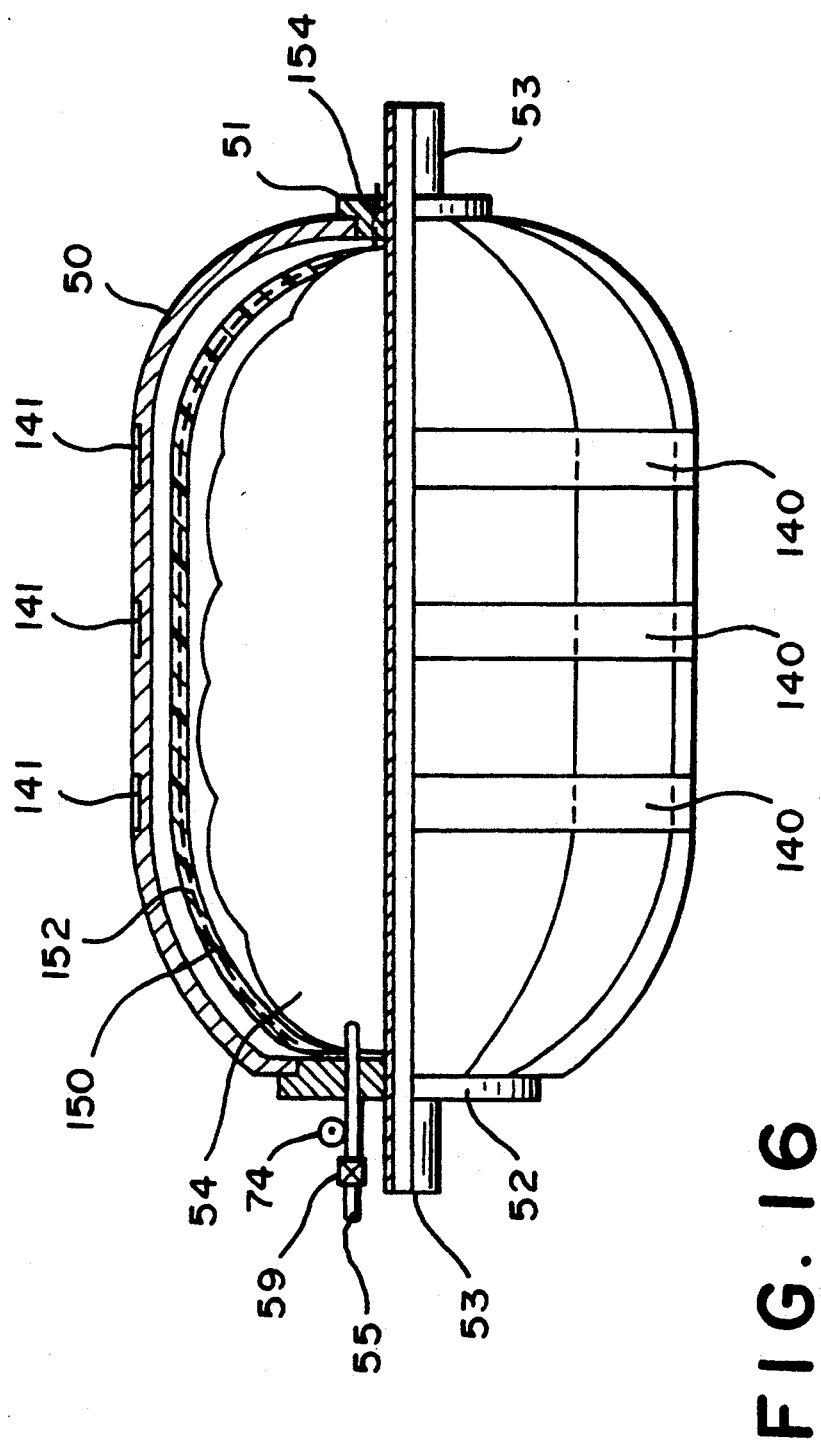
FIG. 16 is a side elevational partially sectioned view of a mandrel in accordance with this invention showing sacrificial external hoop wraps.

In some perceived applications it may be desirable to operate the mandrel with a relatively high pressure differential between the inside and outside of the mandrel, in which case the loads on the interlocking joints may be very high. FIG. 16 illustrates an embodiment of the invention designed to reduce the loads on the interlocking joints in such cases through the use of external sacrificial hoop wraps or bands. The fibrous composite bands 140 sit in circumferential recesses or grooves 141. The number, width, thickness and spacing between the hoop bands is dependent on the amount of the joint loads to be resisted. The hoop bands, while they could be steel straps or wire, perform best if a low strain, high strength carbon fiber is used.

The bands may be applied by winding a filament coated with a suitable resin system into grooves 141 provided on the outside surface of the mandrel to form a composite band structure. Prior to winding the hoop bands on the mandrel, the area to be covered by the bands is coated with a suitable release agent to prevent the bands from adhering to the mandrel. When an internal pressure is applied to the mandrel, the expansion of the mandrel is resisted by the hoop bands. After the part is fabricated and the mandrel is removed the hoop bands are left on the inside of the part. Since the fibers are wound at only one angle, and the bands may be very thin, due to the high strength fiber used, they are easily removed. The hoop bands could also be wound in such a manner with an apertured element on the end of the roving to allow it to be removed by spirally unwrapping the roving by pulling on the apertured element. As with other embodiments of this invention, the hoop bands are designed to be accessible for disassembly from inside the finished part.

The following describes the assembly method of this mandrel invention as configured with a longitudinal through winding shaft and a key segment, and as shown in FIGS. 2-8. The longitudinal winding shaft 53 with both the forward and aft adapter plates 51 and 52 attached is mounted in an assembly fixture 160. The assembly fixture supports the shaft by the ends and is designed such that it allows clearance for the assembled mandrel. Attached to the assembly fixture are cradles 166, 166 contoured to conform to the outer periphery of the assembled mandrel. These cradles are movable vertically between two positions. The raised position engages the outer periphery of the assembled mandrel while the lower position allows for the cradles to completely clear the mandrel with a part installed on it. With the shaft locked to prevent rotation, the slidably mounted sleeve of the forward adapter plate 51 (ring) is locked in position and the aft adapter plate 52 is slid aft on the shaft 53 to allow clearance between it and the mandrel segments when they are installed.

The segments are then installed beginning with a common segment by laying it on the assembly fixture cradles in its proper position and attaching it to the forward adapter plate with bolts which pass through apertures in the adapter plate and engage the segment. Thereafter, the adjacent segments are installed by slidably engaging the complementary joint of the adjoining segment and installing the bolts to attach the segment to the forward adapter plate. After installing all of the segments which can be supported by the assembly fixture cradles, one or more internal bladders, preferably three, are installed in the hollow inside section of the mandrel assembly and attached to the mandrel shaft 53 with straps 58 at the forward and aft ends which engage all bladders and the shaft. Next, the bladders are partially inflated and form a support for assembly of the remaining segments. Installation of the remaining common segments and left and right segments adjacent to each side of the key segment continues as previously described, with the internal bladders providing assembly support.

The key segment 89 is installed by sliding it under the left (87) and right (78) adjacent segments until it is in position against the forward adapter plate 51 and engaged with the complementary joints of the adjacent segments. This is done by urging the key segment under the adjacent segments by compressing the partially inflated bladder. The attachment bolts are installed to rigidly engage the key mandrel segment to the forward adapter plate. Following installation of the final segment, the aft adapter sleeve 67 is slid forward until proper alignment is obtained with the shaft and mandrel segments. The bolts which pass through the aft adapter plate 65 and engage the mandrel segments are installed. This is followed by installation of the retaining pin 60 which rigidly engages the aft adapter plate to the shaft. The assembly procedure is completed by inflating the internal bladders to their proper pressure. Bladder pressure is determined by part design, mandrel design and processing parameters, and is thus particular to each application. For example, in one prototype application the bladder pressure was 20 psi.

A frangible coating may then be applied to the exterior surface of the mandrel and shaped to provide the desired interior contour of the part. If no frangible coating is used and the part being fabricated on the mandrel does not include a barrier layer, such as the internal insulation used in rocket motor cases, a release agent or barrier must be provided to prevent the resin of the fabricated part from adhering to the mandrel and/or from infiltrating the interlocking joints. Adhesive backed release film applied over the joints will prevent resin infiltration. As a further safety precaution, a liquid or dry release agent may be applied to the joints prior to assembly of the mandrel.

The resin component of the composite material is then cured, preferably by heating. Heating may be accomplished in numerous ways, some of which are described above in the Disclosure of Invention section. For example, the bladder pressurizing fluid may be circulated through a steam heat exchanger 56 by a pump 70 connected to a fluid outlet 55' as shown in FIG. 2. Although not shown at the outlet, both inlet 55 and outlet 55' preferably include a shut-off valve 59, a coupling 72 and a pressure gauge 74.

Alternative arrangements for heating the mandrel 49, and thereby the part being formed, are shown in FIGS. 4 and 16. FIG. 4 illustrates use of a plurality of electrical resistance heating elements 68 embedded within and extending longitudinally along each sector piece 50. FIG. 16 illustrates one of a plurality of flexible strip heaters 150 comprising electrical resistance heating elements 152 embedded within a resilient elastomeric material and connected via a pair of wires 51 to a plug 154 for connection to an external source of electrical power. When bladder 54 is fully inflated from the partially inflated condition shown, it presses heaters 150 firmly against the inner faces of sector pieces 50, thereby providing good conductive heat transfer directly between the heating elements 152 and the assembled mandrel 49.

After fabrication and cure of the fibrous/resin composite part following well known industry methods, the mandrel is ready for disassembly and removal. The assembly (part and mandrel) is placed on the assembly cart 160 and supported by the forward and aft ends of the mandrel shaft 53 with the key segment 89 positioned on top (at 12 o'clock). The assembly fixture cradles are raised to support the mandrel and part assembly, thereby freeing the shaft from providing the support. The bladder pressure is released and, if desired, a vacuum may be applied to cause the bladders to fully collapse. The bolts attaching the forward and aft adapter plates are removed, along with the pins engaging the adapter plates to the shaft. The adapter plates are then slid outward away from the segments. Next, the straps attaching the bladders to the shaft at the forward and aft ends are removed, allowing the bladders to be removed.

The longitudinal winding shaft, along with the forward and aft adapter plates, are removed. Next, the key segment is removed from inside the part by urging it radially inward. In some applications, special tooling may be used to help urge the segments inward and to free them from the fiber/resin composite part as some cohesion is possible even when release agent materials are utilized. The remaining segments are disengaged and removed from inside the part through the access port(s) provided by removal of the adapter plates. If any frangible coating was used on the mandrel, it is broken up and also removed. The part is then ready to be removed from the assembly fixture for further processing, and the mandrel is ready for cleaning (if required) and reuse.

FIG. 17 is an illustration showing how a mandrel of the invention would look for fabricating aircraft fuselages. The mandrel 49 is coated with a layer of plaster or other frangible material 200. Since aircraft fuselages structurally are pressure vessels, the availability of a mandrel system in accordance with this invention will permit the low cost fabrication of fuselages by filament winding. The fuselage windows 202, illustrated by broken lines, are cut out after the mandrel and its frangible coating are removed.

Figure 18:
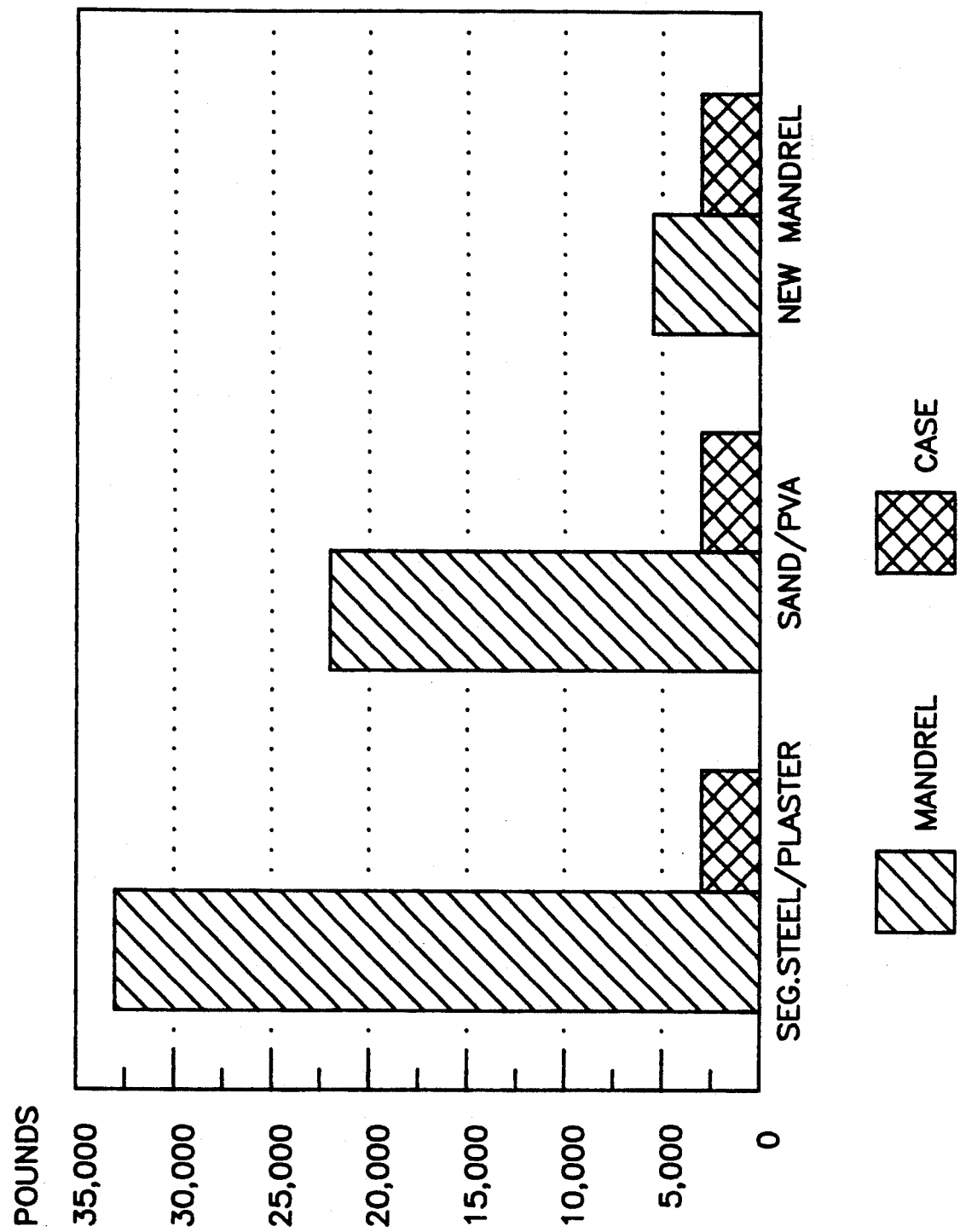
FIG. 18 is a bar graph comparing the weights of two prior art mandrel systems with a mandrel made in accordance with the present invention.

FIG. 18 is a bar graph showing the weights of several mandrel types designed to produce a 92 inch diameter by 160 inch long rocket motor case. The left bar graph is for a segmented steel mandrel with a frangible plaster layer as described previously. The mandrel is used to filament wind a 2,700 lbs. part and weighs 33,000 lbs., 12.2 times more than the weight of the part fabricated on it. The middle bar graph is for a sand/PVA mandrel, as previously described, used to filament wind the same rocket motor case and weights 22,000 lbs., i.e., 8.1 times more than the weight of the part fabricated on it. The right bar graph is the estimated weight of a mandrel designed in accordance with this invention for the same 92 inch diameter by 160 inch long rocket motor case. Analysis shows that this mandrel would weigh only 5,471 lbs, or only 2.02 times the weight of the part, or roughly 27,000 lbs less then the segmented steel/plaster mandrel. While the stiffness data on the segmented steel/plaster and sand/PVA mandrel is not available, based on analysis of the mandrel designed per this invention, it is believed that the new mandrel, in addition to being far lighter, is significantly stiffer. Considering the increased stiffness and materials used, the mandrel per this invention will be dimensionally more stable then the prior art mandrels.

What is claimed is:

1. A mandrel apparatus for forming a hollow shell having an interior chamber extending longitudinally along an axis, and first and second end regions adjacent to said axis at respective ends of said shell, said mandrel apparatus comprising:

a plurality of elongated sector pieces having inner and outer faces and adapted when assembled in an edge-to-edge relationship to form a mandrel having a peripheral wall providing an exterior surface for forming at least a portion of said interior chamber of said shell;

means cooperating with said peripheral wall for forming an opening into said interior chamber of said shell; and, bladder means inflatable within said peripheral wall by a pressurized fluid to apply pressure against said inner faces, said pressure maintaining said sector pieces in said edge-to-edge relationship when said bladder is in an inflated condition;

each of said sector pieces comprising a longitudinally extending wall segment and first and second edge portions extending longitudinally along opposite edges of said wall segment, said edge portions being configured to interlockingly engage corresponding edge portions of adjacent sector pieces when said bladder is in said inflated condition to form connecting joints which retain said sector pieces in a substantially rigid predetermined configuration corresponding to said peripheral wall;

and said connecting joints permitting said sector pieces to be separated when said bladder means is in a deflated condition, said opening being adapted to pass said separated sector pieces out from said interior chamber of said shell after the forming thereof.

2. A mandrel apparatus according to claim 1 wherein said edge portions of adjacent sector pieces laterally overlap each other.

3. A mandrel apparatus according to claim 2 wherein said first and second edge portions each comprise a longitudinally extending and radially protruding lip along a lateral extremity thereof and a longitudinally extending groove disposed laterally inward of and parallel to said lip, said groove being configured to receive the lip of the adjacent sector piece.

4. A mandrel apparatus according to claim 3 wherein each sector piece has one edge portion with said lip protruding radially inward and the other edge portion with said lip protruding radially outward.

5. A mandrel apparatus according to claim 3 comprising three of said sector pieces, one of which is a key sector piece having a radially outward protruding lip along each of its edge portions, and each of the other two of which has a radially inward protruding lip and an adjacent groove configured to engage a corresponding one of said lips of said key sector piece.

6. A mandrel apparatus according to claim 1 wherein said opening forming means comprises an end plate and means for removably securing said end plate to end portions of said plurality of sector pieces.

7. A mandrel apparatus according to claim 1 further comprising detent means for providing lateral engagement between said edge portions to resist longitudinal movement of said sector pieces relative to each other.

8. A mandrel apparatus according to claim 7 wherein said detent means comprises at least one pin member movably mounted on the edge portion of one sector piece to matingly engage a receptacle in the edge portion of an adjacent sector piece, said pin member being biased out of said mating engagement and movable into said mating engagement by inflation of said bladder means.

9. A mandrel apparatus according to claim 1 further comprising at least one hoop means encircling the peripheral wall of said mandrel in a plane substantially perpendicular to said axis for sharing transverse loads imposed on said joints by inflation of said bladder means.

10. A mandrel apparatus according to claim 9 wherein said hoop means comprises a fibrous composite band.

11. A mandrel apparatus according to claim 1 wherein said sector pieces each comprise a fibrous material impregnated with a synthetic resin.

12. A mandrel apparatus according to claim 11 wherein said fibrous material comprises unidirectional carbon fibers extending longitudinally along the longitudinal extent of said wall segment.

13. A mandrel apparatus according to claim 11 wherein the edge portions of said sector pieces each comprise a metal strip.

14. A mandrel apparatus according to claim 11 wherein the wall segment of each of said sector pieces comprises a plurality of laminated layers.

15. A mandrel apparatus according to claim 14 wherein said layers each comprise a fibrous material impregnated with a synthetic resin.

16. A mandrel apparatus according to claim 1 further comprising support means for supporting said assembled mandrel on a supporting surface while said shell is being formed; and wherein said support means comprises at least two shaft portions each extending along said axis and secured to a corresponding portion of the peripheral wall of said mandrel.

17. A mandrel apparatus according to claim 16 wherein said support means comprises means for rotation of said assembled mandrel relative to the supporting surface.

18. A mandrel apparatus according to claim 1 wherein said bladder means comprises a flexible sheet made from a silicon elastomer.

19. A mandrel apparatus according to claim 1 wherein said bladder means comprises a plurality of bladder elements and a common manifold for supplying the pressurized fluid to each of said plurality of bladder elements.

20. A mandrel apparatus according to claim 1 further comprising means for heating the material of said shell during the forming thereof on the exterior surface of said mandrel.

21. A mandrel apparatus according to claim 20 wherein said heating means comprises means for heating said bladder means.

22. A mandrel apparatus according to claim 20 wherein said heating means comprises means for providing heated fluid to said bladder means.

23. A mandrel apparatus according to claim 20 wherein said heating means comprises electrical resistance heating elements carried by said sector pieces.

24. A mandrel apparatus according to claim 20 wherein said heating means comprises heating elements embedded in a flexible material and positioned between said bladder means and the inner faces of said sector pieces.

25. A mandrel apparatus according to claim 1 wherein said shell is formed from a frangible material and has an outer surface contoured for forming the interior of an article from which said shell may be subsequently broken up and removed after said separated sector pieces are passed from said interior chamber through said opening.

26. A method of making a rigid mandrel for forming a hollow shell having an interior chamber extending longitudinally along an axis, and first and second end regions adjacent to said axis at respective ends of said shell, said method comprising:
arranging in an edge-to-edge relationship a plurality of elongated sector pieces having inner and outer surfaces to form a mandrel having a peripheral wall providing an exterior surface for forming at least a portion of said interior chamber of said shell, each of said sector pieces comprising a longitudinally extending wall segment and first and second edge portions extending longitudinally along opposite edges of said wall segment;
inflating bladder means within said peripheral wall by a pressurized fluid to apply pressure against said inner faces, said edge portions being configured to interlockingly engage corresponding edge portions of adjacent sector pieces when said bladder is in an inflated condition to form connecting joints which retain said sector pieces in a substantially rigid predetermined configuration corresponding to said peripheral wall, and said connecting joints permitting said sector pieces to be separated when said bladder means is in a deflated condition; and,
providing means for cooperating with said peripheral wall to form an opening into said interior chamber of said shell, said opening being adapted to pass said separated sector pieces out from said interior chamber of said shell after the forming thereof.

* * * * *